United States Patent [19]

Lee

[11] 4,451,595

[45] May 29, 1984

[54] HETEROGENEOUS RUBBER COMPOSITIONS MADE FROM CHEMICALLY SIMILAR BLENDS

[75] Inventor: Biing-Lin Lee, Broadview Heights, Ohio

[73] Assignee: The B. F. Goodrich Company, Akron, Ohio

[21] Appl. No.: 460,689

[22] Filed: Jan. 24, 1983

[51] Int. Cl.³ .............................................. C08K 3/04
[52] U.S. Cl. .................................... 523/351; 524/526
[58] Field of Search ......................... 523/351; 524/526

[56] References Cited

U.S. PATENT DOCUMENTS

| | | | |
|---|---|---|---|
| 3,294,720 | 12/1966 | Beber et al. ........................ | 523/351 |
| 3,846,371 | 11/1974 | Ro ..................................... | 523/353 |
| 3,872,036 | 3/1975 | Todani et al. ...................... | 523/351 |
| 4,222,906 | 9/1980 | Briggs et al. ....................... | 524/322 |
| 4,321,168 | 3/1982 | Ueda et al. ........................ | 523/351 |
| 4,342,670 | 8/1982 | Ahagon et al. .................... | 523/353 |

FOREIGN PATENT DOCUMENTS 51450 5/1982 European Pat. Off. .

*Primary Examiner*—Herbert J. Lilling
*Attorney, Agent, or Firm*—James R. Lindsay; Daniel J. Hudak

[57] ABSTRACT

A heterogeneous rubber composition having improved flex crack growth resistance and heat buildup is made by blending together separate fractions of chemically similar rubber compounds and ingredients such as carbon black.

20 Claims, 5 Drawing Figures

4,451,595

HETEROGENEOUS RUBBER COMPOSITIONS MADE FROM CHEMICALLY SIMILAR BLENDS

TECHNICAL FIELD

The present invention relates to a process for making a heterogeneous rubber composition having a heterogeneous ingredient distribution therein by blending together chemically similar rubber compounds and ingredients such as carbon black. The rubber composition has improved flex crack growth resistance and heat buildup.

BACKGROUND ART

Heretofore, various different elastomer blends containing carbon black therein have been mixed with each other with respect to investigating various chemical and physical properties. For example, an article "Carbon Black Distribution in Elastomer Blends" by Hess, Scott, and Callan, Rubber Chemistry and Technology, pages 371 through 383, Volume 40, 1967, discusses the degree of subdivision of different polymer systems and the distribution of reinforcing filler particles between the phases.

Elastomer Blends, Compatibility and Relative Response to Fillers by Callan, Hess and Scott, pages 815–837, Rubber Chemistry And Technology, 1971, relates to zone size variations among different polymer blends, compatibility of butadiene rubber and styrenebutadiene rubber, filler distribution between separate polymer phases as influenced by fundamental polymer and filler characteristic and carbon black transfer.

The article, Effect of Heterogeneous Carbon Black Distribution on the Properties of Polymer blends by Sircar, Lamond, and Pinter, pages 48–56, Rubber Chemistry and Technology, 1974, relates to comparisons of blends of varying compatibility, for example, styrene-butadiene rubber and polybutadiene rubber, styrene-butadiene rubber and natural rubber, polybutadiene rubber and natural rubber, and polybutadiene rubber and chlorobutyl rubber. Further, the article Elastomer Blend Properties-Influence of Carbon Black Type and Location by Hess and Chirico, page 301–326, Rubber Chemistry and Technology, Vol. 50, 1977, relates to the study of various blends of different types of rubber and their performance as affected by carbon black.

Finally, the article Experimental Studies of the Relationship of Processing to the Crack Growth of Carbon-Black-Loaded SBR-Cis-Polybutadiene Compounds by Biing-lin Lee, Journal of Applied Polymer Science, Vol. 27, pages 3379–3392 (1982), relates to multi-component polymer systems which are blended together to achieve improved results.

However, none of these articles relate to or suggest the blending of separate but chemically similar rubber compounds or ingredients to yield different and unexpected results such as improved crack growth resistance and reduced heat buildup in elastomer compositions.

DISCLOSURE OF INVENTION

It is therefore an aspect of the present invention to produce a rubber composition having improved crack growth resistance made from separate but chemically similar systems or fractions of rubber compounds and carbon black.

It is another aspect of the present invention to produce a rubber composition made from separate but chemically similar fractions, as above, wherein said fractions produce a heterogeneous distribution of rubber compounds and ingredients.

It is another aspect of the present invention to produce a rubber composition made from separate but chemically similar fractions, as above, wherein said rubber fractions contain different amounts of carbon black.

It is yet another aspect of the present invention to produce a rubber composition made from separate but chemically similar fractions, as above, wherein one rubber fraction contains a major fraction of rubber, carbon black, and the like, and wherein a second fraction contains a minor fraction of rubber, carbon black, and the like.

It is yet another aspect of the present invention to produce a rubber composition made from separate but chemically similar systems, as above, wherein one system, that is a major fraction, is high modulus and where another system, that is a minor fraction, is low modulus.

It is yet another aspect of the present invention to produce a rubber composition made from separate but chemically similar blends, as above, wherein said rubber is made from conjugated dienes having from 4 to 10 carbon atoms, or a copolymer made from the reaction of conjugated dienes having from 4 to 10 carbon atoms with vinyl substituted aromatic compounds having from 8 to 12 carbon atoms, or nitrile rubber.

These and other aspects of the present invention will become more apparent from the detailed specification set forth hereinbelow.

In general, a process for making a crack growth resistant rubber composition, comprising the steps of:

(a) forming a heterogeneous rubber composition comprising by weight approximately 100 total parts of a rubber, and from about 60 to about 95 total parts of a carbon black, said rubber composition formed by (b) separately forming a minor fraction comprising at least one rubber compound, and carbon black, said rubber compound made from nitrile rubber, monomers selected from the group consisting of conjugated dienes having from 4 to 12 carbon atoms, copolymers made from monomers selected from the group consisting of conjugated dienes having from 4 to 12 carbon atoms and vinyl substituted aromatics having from 8 to 12 carbon atoms, said minor fraction containing from about 10 to about 50 parts by weight of said rubber, and an amount of carbon black ranging from about 2.5 parts by weight of about 37.5 parts by weight;

(c) separately forming a major fraction comprising a similar rubber compound and carbon black as in said minor fraction, said major fraction having a range of said rubber ranging from about 50 to about 90 parts by weight and an amount of said carbon black ranging from about 22.5 to about 92.5 parts by weight;

(d) separately mixing and heating at least one of said fractions; and (e) mixing together under heat said major fraction and said minor fraction to produce said heterogeneous rubber composition.

In general, a crack growth resistant heterogeneous rubber composition, comprising: a mixed blend of a major fraction and a minor fraction forming said heterogeneous rubber composition, said major fraction and said minor fraction having chemically similar rubber and carbon black therein, said heterogeneous composition comprising by weight approximately 100 total parts of rubber, and from about 60 to about 95 total parts of a carbon black, said minor fraction comprising from about 10 to about 50 parts by weight of at least one rubber compound and an amount by weight of carbon black ranging from about 2.5 parts to about 37.5 parts by weight, and said major fraction comprising an amount of said rubber ranging from about 50 parts to about 90 parts by weight, and said major fraction having a carbon black range by weight of from about 22.5 to about 92.5.

BEST MODE FOR CARRYING OUT THE INVENTION

The present invention relates to a rubber composition and a process for making it such that improved crack growth resistant rubber products are made. Chemically similar or identical systems or fractions of rubber compounds, carbon black, and various ingredients are separately formed, and then mixed together to form the final product or composition. The resultant final blend is a rubber composition having improved properties. Generally, one of the initial fractions, or, if mixed, blend has a high modulus and another chemically similar fraction or blend has a low modulus. In the final product, the low modulus fraction is dispersed throughout the high modulus rubber fraction or matrix.

Considering the product or the final rubber composition, it comprises a rubber made from conjugated dienes having from 4 to 10 carbon atoms, a copolymer made from conjugated dienes having from 4 to 10 carbon atoms and vinyl substituted aromatic hydrocarbons having from 8 to 12 carbon atoms, nitrile rubber, and combinations thereof. Examples of various rubbers made from such dienes include synthetic cis-1,4-polyisoprene, natural rubber, cis-polybutadiene, and a styrene-butadiene copolymer rubber. Such elastomers or rubbers are preferred. Examples of other elastomers include those made from 2-methyl-1,3-pentadiene, 4,5-diethyl-1,3-octadiene, and the like. Examples of vinyl substituted aromatic hydrocarbons include styrene, 1-vinyl naphthalene, alpha-methylstyrene, and the like. A highly preferred rubber of the present invention is a copolymer made from styrene-butadiene monomers.

The final product blend or composition contains carbon black in a total amount of from about 60 to about 95 parts per approximately 100 parts of rubber by weight as part of the ingredients. A desirable amount is from about 75 to about 90 parts with about 85 parts by weight being preferred. The carbon black may be generally of any type, that is high surface area, low surface area, high structure type, as well as a low structure type. However, the high structure type is somewhat desirable. Generally, the rubber composition or final blend of the present invention contains a substantial amount of oil as part of the ingredients. Any type of conventional oil may be utilized as well known to those skilled in the art, such as an aromatic oil, as in an amount of from about 40 to about 65 parts per 100 parts of rubber, desirably from about 55 to about 65 parts and preferably from about 60 parts by weight.

Figure 1:
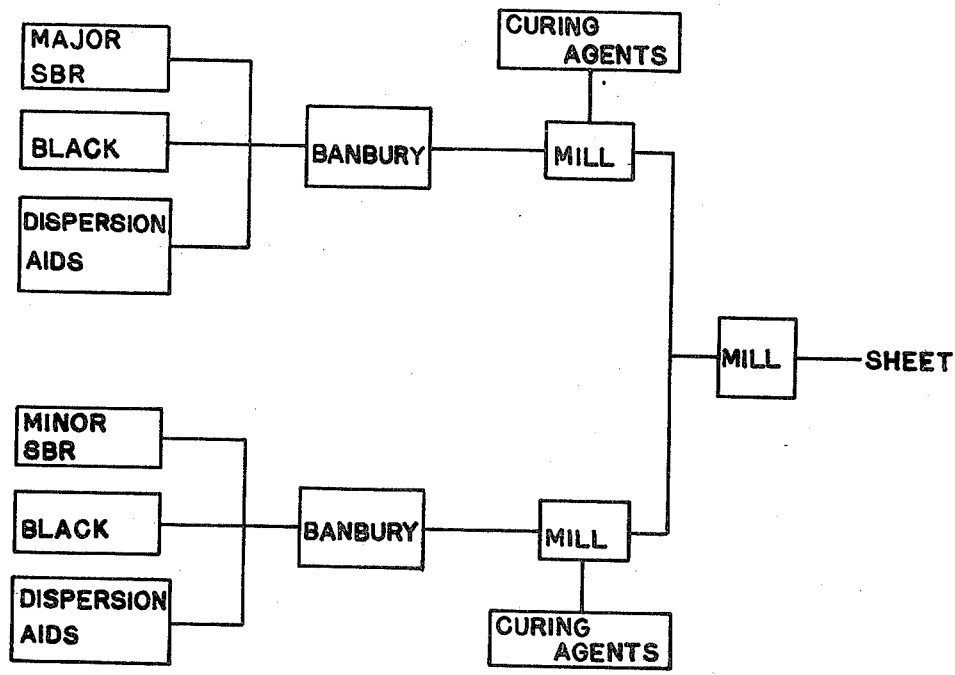
FIG. 1 relates to a schematic diagram as to a process of preparing a rubber composition according to the present invention.
Figure 5:
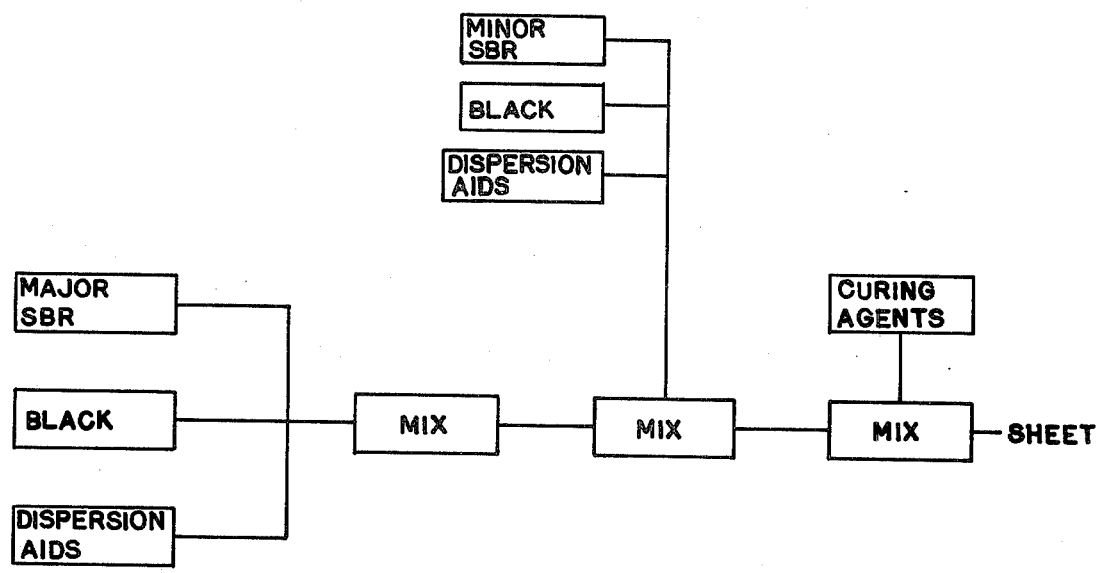
FIG. 5 relates to another process of preparing a rubber composition according to the present invention.

Referring now specifically to FIG. 1, two different blends containing similar or chemically identical types of rubber compounds are separately mixed and then added to the Banbury. Among such ingredients are carbon black and various conventional compounding aids as set forth hereinbelow. After mixing for awhile, curing agents are added to each separate blend whereupon they are mixed for a short while. The two separate blends are then brought together to form the final rubber blend or composition. According to the so-called one step mixing procedure, as shown in FIG. 5, one fraction is mixed or blended. Then, the remaining system is added to the blended system and mixed. Lastly, the curing agents are added and mixed to form the final rubber composition.

One of the systems is called a minor fraction blend since it generally contains a minor fraction of the various components of the total rubber recipe. With regard to the rubber component, the minor fraction contains from about 10 to about 50 parts by weight of rubber, desirably from about 20 to about 45, and preferably from about 30 to 40 parts, of the total rubber, that is of the approximate 100 parts by weight in the final blend. The rubber can be and is of the types of rubber set forth above. The amount of carbon black in the minor fraction ranges from about 25 to about 75 percent of the total amount of carbon black in the final blend. Thus, the amount of carbon black can broadly range from about 2.5 to about 37.5 parts in the minor fraction, desirably from about 5 to about 34, and preferably from about 7.5 parts by weight to about 30 parts by weight. Greater amounts of carbon black tend to result in loss in tensile strength in the final item, such as a tire or conveyor belt, whereas too little carbon black results in poor wear resistance.

In addition to the above compounds in the minor fraction, various other types of ingredients may be utilized well known to those skilled in the rubber art, and especially with regard to the production of tires. Such additional ingredients are typical of conventional compounding aids well known to the art and can be utilized in conventional amounts. Thus, zinc oxide may be utilized, various tackifier agents, stearic acid, various antioxidants, various antiozonates, various accelerators, curing agents, and the like. The use of such compounds generally does not form a part of the present invention.

According to the concepts of the present invention, the major fraction has similar and preferably the same or identical chemical compounds as the minor fraction, with regard to the pertinent compounds. By pertinent compounds, it is meant the various rubber and carbon black. That is compounds which are necessary to forming a low modulus blend or a high modulus blend. Generally, the major fraction also contains the same identical ingredients which are generally conventional compounding aids, such as those above-noted, for example, zinc oxide, stearic acid, oil, various ozonates, accelerators, antioxidants, curing agents, etc., and the like. With regard to the rubber compound, by chemically identical is meant that if the minor fraction contains only an SBR rubber, the major fraction contains only an SBR rubber, and nothing else. Should the minor fraction contain a combination of rubbers, for example, SBR rubber and natural rubber, that is cis-1,4-polyisoprene, the major fraction contains only SBR rubber and natural rubber. In other words, the pertinent rubber compounds of the major fraction or blend are the same as the minor fraction. When the major and minor fractions are similar, the minor fraction will contain at least one of the same rubber compounds as contained in the major fraction. In the present invention, preferably, the rubber fractions are identical. Although carbon black exists as lamp black, furnace black, it is still carbon black and hence considered to be identical even when different types are used in the major and minor fraction. With regard to the various conventional ingredients such as zinc oxide, stearic acid, various antioxidants, various antiozonates, various curing agents, accelerators, etc., generally the same particular ingredient is used in both the major and the minor fraction. However, it is to be understood that a different particular ingredient, e.g., a different accelerator, antioxidant, etc., can be used in the minor fraction than in the major fraction, or vice versa, and that one fraction need not contain one or more of the particular ingredients contained in the other fraction. Thus, the major fraction and the minor fraction are similar and preferably identical with regard to the rubber compounds, and possibly only differ with regard to the various amounts of a particular ingredient therein. Of course, both fractions have carbon black therein as an ingredient.

The amount of a particular compound, for example a particular rubber, in the major fraction is the difference of the amount contained by the minor fraction subtracted from the total amount. Thus, if the minor fraction has only SBR rubber in an amount of about 40 parts by weight, the major fraction will have the difference of the SBR, that is 60 parts by weight. Hence, the amount of said similar or same said rubber will range from about 50 to about 90 parts by weight, desirably from about 55 to about 80, and preferably from about 60 to about 70 parts by weight. The same difference aspect is true for the carbon black. Thus, the carbon black in the major fraction can range from about 25.5 to about 92.5, desirably from about 41 to about 85, and preferably from about 55 to about 77.5 parts by weight. The amounts of the various compounding aids which include such conventional ingredients such as stearic acid, zinc oxide, antioxidants, antiozonates, etc., also generally exist as the difference between the minor fraction and the total amount of the specific item.

Referring now to FIG. 1, although the major and the minor fraction are separately blended and then added together and blended to form the final blend, the blending procedure is generally the same. That is, for either fraction, a predetermined amount of rubber is added thereto along with the carbon black. Also added thereto are the various compounding ingredients such as oil, zinc oxide, stearic acid, the various antioxidants, and the like. Generally, the only compound not added at this point are the various curing agents. The particular fraction along with the various ingredients are then mixed in any conventional mixer at generally low temperatures for a short period of time. For example, the mixer can be a Banbury and the amount of time can vary from about 2 to about 5 minutes, with from about 2 to 3 minutes being preferred. The Banbury temperature is generally from about 180° F. to about 240° F. During mixing, the temperature will increase with the final temperature of either blend being dumped or completed at a temperature of about 250° F. to about 350° F. At this stage, the various curing agents are added and mixed in any conventional mixing device. A desirable mixing device is a mill which once again operates at a low temperature for a short period of time. Although the mixing time can range from about 1 to about 3 minutes, generally only from 1 to about 2 minutes is desired with the mill temperature being from about 130° F. to about 200° F., with desirably a temperature of approximately 130° F. to 150° F. being preferred. Upon completion of mixing of the curing agents with the major fraction, and the separate mixing of curing agents with the minor fraction, the two fractions are then brought together and mixed in a conventional manner. For example, the major fraction can be added to the mill and the minor fraction added thereto. Mixing occurs for only a short period of time, for example from about 1 to about 3 minutes, with from about 1 to about 2 minutes being preferred. The final blending temperature can generally range from about 130° F. to about 200° F., with from about 130° F. to about 150° F. being desired. Generally, such temperatures and time periods are conventional. Other conventional temperatures and time periods can be utilized as known to the art, in order to produce a substantially uncured item.

In lieu of the "two step" mixing procedure of FIG. 1, the one step mixing procedure of FIG. 5 can be utilized. This procedure is similar to FIG. 1 except that one of the fractions or procedures is not separately mixed, but rather is added to the other blended fraction and then mixed, as on the same mill and hence called "one step." Curing agents are then added and blended. The blending times and temperatures of this procedure are generally the same as above. For example, when the unmixed fraction is added to the blended fraction, the temperature and time is generally the same as when two blended fractions are blended together. Of course, other mixing procedures can be utilized. The important aspect is that at least one of the systems or fractions is separately mixed and then the two systems or fractions are brought together and blended.

Upon completion of the mixing, the article can be made into any desirable item. For example, specific uses of the final blend or rubber composite made according to the present invention includes tires, such as passenger tires, truck tires, radial tires, and the like, and especially with regard to the tread portion of the tire. Another area of utility includes use in various conveyor belts and the like.

After the item is made, since it is substantially uncured, it is cured in any conventional manner as by heating. For example, the item can be cured by heating at about 300° F. for about 25 minutes. Of course, the method, time and temperature of cure greatly varies, depending upon the different rubbers.

Although the major fraction and the minor fraction are chemically similar, when at least one fraction or system is mixed separately and then added to each other and mixed, a homogeneous blend or composition is not obtained. Rather, a heterogeneous blend or composition results. This is due to the fact that one of the fractions is generally of a low modulus phase whereas the other fraction is of a high modulus phase. Upon formation of the final composition, the low modulus phase is dispersed at a discontinuous phase or a continuous phase, depending upon the amount of low modulus material utilized. Whether or not a phase is the low modulus phase, generally depends upon the amount of rubber and carbon black utilized. Usually, the minor fraction is the low modulus phase. This is because the amount of carbon black contained therein by weight is approximately about half, that is from about 25 to about 75 percent by weight of the total amount of weight of rubber in the minor fraction. Thus, the major fraction constitutes a high modulus phase in that it will have a high amount of carbon black therein on a weight basis in comparison to the amount of rubber therein. When the two fractions are mixed together, the minor fractions is dispersed throughout the major fraction as noted, thus forming a heterogeneous blend of composition. The low modulus phase can serve as stress relief sites and impart better crack growth resistance to the overall blend or final product, even though chemically similar blends were separately prepared and then mixed together.

The invention will be better understood by reference to the following examples.

TABLE I

| OVERALL RECIPE OF THE SBR COMPOUND | |
|---|---|
| Chemical Name | Recipe 0 (Control) PHR |
| oil extended SBR | 137.5 { SBR 100 / oil 37.5 |
| aromatic extending oil | 22.5 |
| HAF HS black | 85 |
| zinc oxide | 2 |
| quanidine type antioxidant | 0.1 |
| stearic acid | 2.0 |
| diamine antiozonate | 1.70 |
| quinoline antioxidant | 2.0 |
| sulfenamide accelerator | 1.80 |
| sulfur | 1.75 |
| | 256.35 |

Various proportions of the compounds set forth in the recipe above were separated into two blends, a major fraction and a minor fraction, as set forth in Tables II and III.

TABLE II

| | RECIPE FOR MAJOR AND MINOR FRACTIONS TO FORM SBR BLEND | | | | | | | |
|---|---|---|---|---|---|---|---|---|
| | #1 | | #3 | | #5 | | #6 | |
| Ingredient | MAJOR FRACTION | MINOR FRACTION | MAJOR FRACTION | MINOR FRACTION | MAJOR FRACTION | MINOR FRACTION | MAJOR FRACTION | MINOR FRACTION |
| Oil extended SBR | 123.7 | 13.8 | 110 | 27.5 | 96.2 | 41.3 | 82.5 | 55 |
| Aromatic extending oil | 20.25 | 2.25 | 18 | 4.5 | 15.75 | 6.75 | 13.5 | 9.0 |
| HAF HS black | 80 | 5 | 75 | 10 | 70 | 15 | 65 | 20 |
| Zinc oxide | 1.8 | 0.2 | 1.6 | 0.4 | 1.4 | 0.6 | 1.2 | 0.8 |
| Quanidine type antioxidant | 0.09 | 0.01 | 0.08 | 0.02 | 0.07 | 0.03 | 0.06 | 0.04 |
| Stearic acid | 1.8 | 0.2 | 1.6 | 0.4 | 1.4 | 0.6 | 1.20 | 0.80 |
| Diamine antiozonate | 1.53 | 0.17 | 1.36 | 0.34 | 1.19 | 0.51 | 1.02 | 0.68 |
| Quinoline antioxidant | 1.8 | 0.2 | 1.6 | 0.4 | 1.4 | 0.6 | 1.2 | 0.80 |
| Sulfenamide accelerator | 1.62 | 0.18 | 1.44 | 0.36 | 1.26 | 0.54 | 1.08 | 0.72 |
| Sulfur | 1.575 | 0.175 | 1.40 | 0.35 | 1.225 | 0.525 | 1.05 | 0.65 |
| Volume fraction of low modulus domain | | 9.2% | | 18.4% | | 27.2% | | 36% |

TABLE III

| | RECIPE OF MAJOR FRACTION AND MINOR FRACTION PAIRS TO FORM AN SBR BLEND | | | |
|---|---|---|---|---|
| | #2 | | #4 | |
| Ingredient | MAJOR FRACTION | MINOR FRACTION | MAJOR FRACTION | MINOR FRACTION |
| Oil Extended SBR | 110 { SBR 80 / oil 30 | 27.5 { SBR 20 / oil 7.5 | 110 | 27.5 |
| Aromatic extending oil | 18 | 4.5 | 18 | 4.5 |
| HAF HS black | 85 | 0 | 55 | 30 |
| Zinc oxide | 1.6 | 0.4 | 1.6 | 0.4 |
| Quanidine type antioxidant | 0.08 | 0.02 | 0.08 | 0.02 |
| Stearic acid | 1.6 | 0.4 | 1.6 | 0.4 |
| Diamine antiozonate | 1.36 | 0.34 | 1.36 | 0.34 |
| Quinoline antioxidant | 1.6 | 0.4 | 1.6 | 0.4 |
| Sulfenamide accelerator | 1.44 | 0.36 | 1.44 | 0.36 |
| Sulfur | 1.40 | 0.35 | 1.40 | 0.35 |

In Recipes 0 through 6, both the major fraction and the minor fraction were mixed in a manner as set forth in FIG. 1. The various ingredients for each fraction, that is both the major fraction and the minor fraction were added to a separate B-Banbury and mixed at 77 RPM. The initial chamber temperature was about 200° F. and the dump temperature of the Banbury was about 300° F., plus or minus 5° F. The temperature of the mill was set at approximately 140° F. The mixing in the Banbury was approximately from 2 to 3 minutes. The fraction was then transferred to the mill and curing agents added and mixed for about 1 to 2 minutes. The major fraction and minor fraction of each chemically identical recipe was then added to the same mill having a temperature of approximately 140° F. and mixed for 1 to 2 minutes. The final rubber composition was then cured at 300° F. for approximately 25 minutes. A flex crack growth test was conducted as follows on the various blended recipes.

Flex Crack Growth Test

Flex crank growth tested in a rotating ring crack growth tester or commonly called the "belt flexer" which was derived by J. R. Beatty and A. E. Juve.(4) The test conditions were as follows:
Chamber temperature: 70° C. (158° F.),
Load: 3 pounds,
Scale division at start: 2.5 units (1 unit—1 mm),
Rotating speed: 300 cycles/min.
(4) Rubber Chem. Technology 38 719 (1965).

The heat buildup test was conducted in the following manner:

The heat buildup was determined by the Goodrich Flexometer(5). The test conditions were 0.175 inch dynamic stroke and 143 psi load. Two different chamber temperatures were chosen: 158° F. (70° C.) for the 80;20 SBR blends (Table III) and 118° F. for the SBR polyblends (Table II). Note that a quite often cited chamber temperature in the internal reports is 118° F. The 158° F. (70° C.) chamber temperature was chosen for the purpose of comparing ΔT and flex crack growth on the (5) ASTM D623, Method A.

Figure 2:
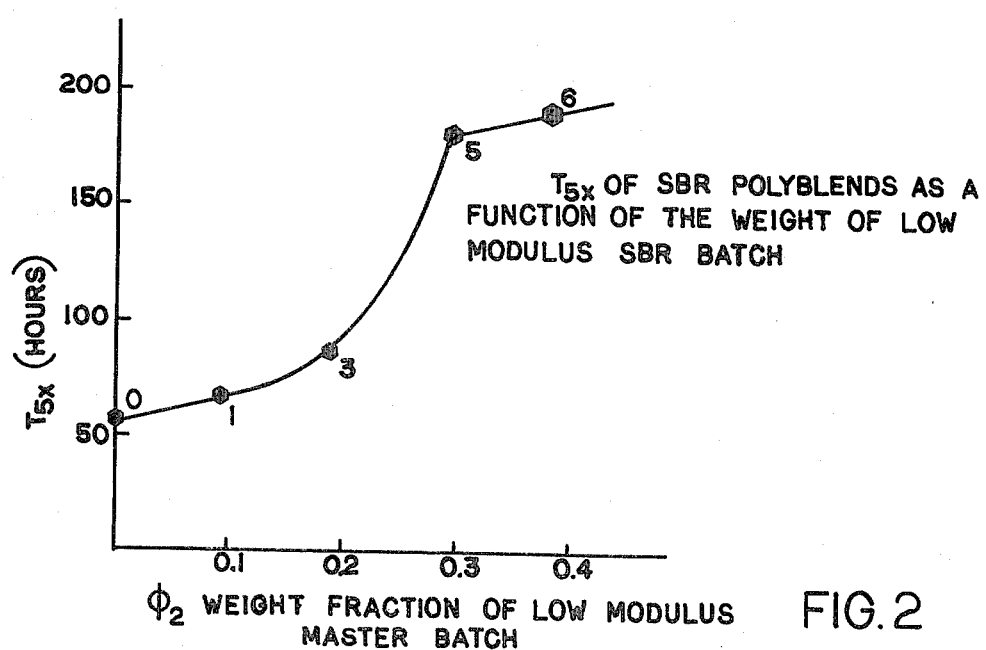
FIG. 2 relates to crack growth resistance of a rubber composition made according to the present invention wherein the amount of the low modulus fraction was varied.

According to the above procedure, minor fractions and major fractions were made utilizing recipes 1, 3, 5 and 6. In these recipes, it is noted that the amount of carbon black was kept at one-half, that is 50 percent the content of the amount of rubber in the minor fractions. However, the volume fraction of the low modulus fraction was increased throughout the recipes. Data was taken comparing the volume fraction of the minor portion against the crack growth resistance. The results are set forth in FIG. 2. As apparent from FIG. 2, as the amount of weight fraction of the minor fraction increased, the crack growth resistance also increased. It is further noted that at weight fractions of about 30 to 40 percent, the resistance to cracking has increased approximately three times over the Control, Recipe 0. In the control, all ingredients were added to one mixing device and then mixed, instead of mixed according to the process of the present invention.

Figure 3:
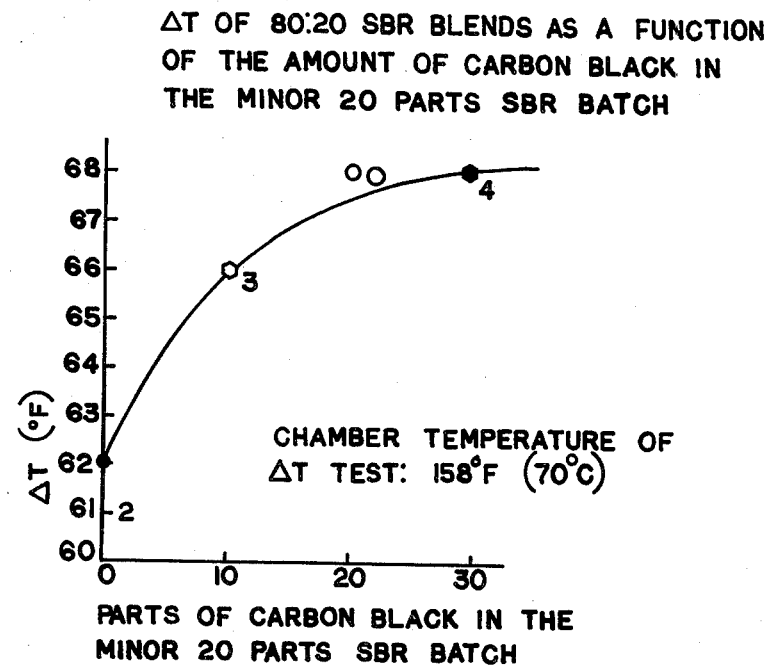
FIG. 3 relates to heat buildup of a rubber composition as a function of the carbon black in the minor fraction.

FIG. 3 is a graph showing the heat buildup of styrene-butadiene rubber compounds as a function of the amount of carbon black in the minor fraction wherein the minor fraction always contained 20 percent by weight of the total amount of rubber in both the minor and major fraction blend. Recipes 2, 3, and 4 were utilized along with the control Recipe 0. As apparent from FIG. 3, as the amount of carbon black increased, the amount of heat buildup also increased. Thus, it is desirable to utilize a small amount of carbon black in the minor fraction portion with regard to heat buildup.

Figure 4:
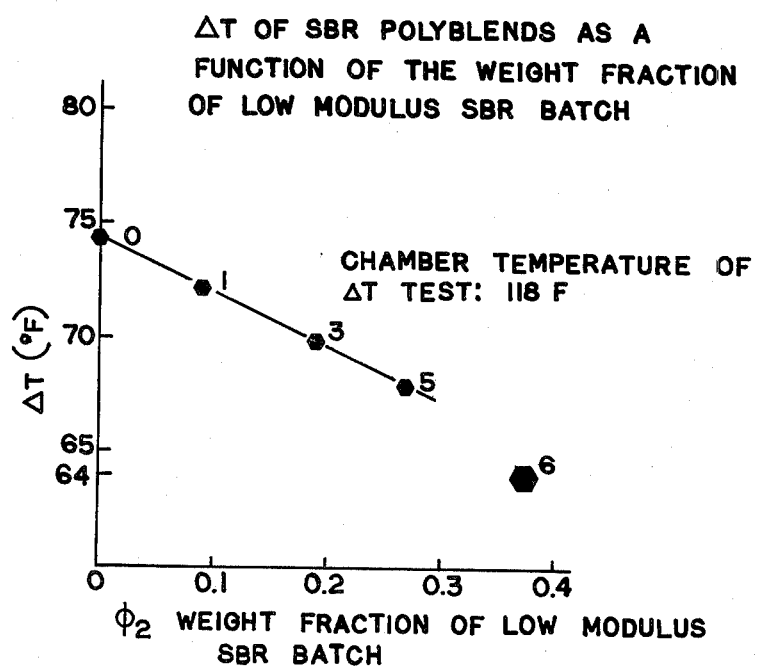
FIG. 4 relates to crack growth resistance of a rubber composition as a function of the weight fraction of the low modulus blend.

FIG. 4 is similar to FIG. 3, except that it relates to varying the amount of weight fraction of the minor fraction in comparison to the overall weight of both blends. These blends were made and prepared in a manner as noted above. As indicated by FIG. 4, greater amounts by weight of the minor fraction gave reduced heat buildup, in comparison with the control.

It is thus apparent that from the above examples, applicant's invention relating to a final heterogeneous rubber blend having two phases therein, be it either continuous or discontinuous, as well as for a process for making the same final rubber blend through two separate but chemically identical recipes via a mixing process, results in vastly improved crack growth resistance.

While in accordance with the patent statutes, a best mode and preferred embodiment has been presented, the scope of the invention is set forth by the attached claims.

What is claimed is:

1. A process for making a crack growth resistant rubber composition, comprising the steps of:
   (a) forming a heterogeneous rubber composition comprising by weight approximately 100 total parts of a rubber, and from about 60 to about 95 total parts of a carbon black, said rubber composition formed by
   (b) separately forming a minor fraction comprising one or more rubber compounds, and carbon black, said rubber compound selected from the group consisting of nitrile rubber, a polymer made from a conjugated diene having from 4 to 12 carbon atoms, and a copolymer made from monomers selected from the group consisting of conjugated dienes having from 4 to 12 carbon atoms and vinyl substituted aromatics having from 8 to 12 carbon atoms, said minor fraction containing from about 10 to about 50 parts by weight of said rubber, and an amount of carbon black ranging from about 2.5 parts by weight to about 37.5 parts by weight;
   (c) separately forming a major fraction comprising an identical one or more rubber compounds and a similar carbon black as in said minor fraction, said major fraction having a range of said rubber ranging from about 50 to about 90 parts by weight and an amount of said carbon black ranging from about 22.5 to about 92.5 parts by weight;
   (d) separately mixing and heating at least one of said fractions; and
   (e) mixing together under heat said major fraction and said minor fraction to produce said heterogeneous rubber composition.

2. A process according to claim 1, wherein in said minor fraction the amount of said rubber ranges from about 20 to about 45 parts by weight, and wherein the amount of said carbon black ranges from about 5 to about 34 parts by weight, and wherein in said major fraction said amount of rubber ranges from about 55 to about 80 parts by weight and wherein the amount of said carbon black ranges from about 41 to about 85 parts by weight.

3. A process according to claim 2, wherein said rubber in said major fraction and said minor fraction is selected from the group consisting of natural rubber, synthetic cis-1,4-polyisoprene, cis-polybutadiene, and styrene-butadiene rubber.

4. A process according to claim 3, including mixing under heat said major fraction components, adding said minor fraction components to said major fraction, and mixing under heat to produce said heterogeneous rubber composition.

5. A process according to claim 3, including separately mixing under heat said major fraction components, separately mixing under heat said minor fraction components, adding said mixed major fraction and said mixed minor fraction together and mixing under heat.

6. A process according to claim 4, and including at least another rubber in said major fraction and including at least a similar rubber in said minor fraction, wherein in said minor fraction said amount of rubber ranges from about 30 to about 40 parts by weight, and wherein said amount of carbon black ranges from about 7.5 to about 30 parts by weight, and wherein in said major fraction, said amount of rubber ranges from about 60 to about 70 parts by weight and wherein the amount of carbon black ranges from about 55 to about 77.5 parts by weight.

7. A process according to claim 5, and including at least another rubber in said major fraction and including at least a similar rubber in said minor fraction, wherein in said minor fraction said amount of rubber ranges from about 30 to about 40 parts by weight, and wherein said amount of carbon black ranges from about 7.5 to about 30 parts by weight, and wherein in said major fraction, said amount of rubber ranges from about 60 to about 70 parts by weight and wherein the amount of carbon black ranges from about 55 to about 77.5 parts by weight.

8. A process according to claim 4, including adding curing agents to said mixed major blend and said minor blend, and mixing, and including mixing said major fraction at a temperature of from about 180° F. to about 350° F., mixing said minor fraction at a temperature of from about 180° F. to about 350° F., and mixing said mixture containing said major blend, said minor blend, and said curing agents at a temperature of from about 130° F. to about 200° F.

9. A process according to claim 5, including adding curing agents to said mixed major fraction and mixing, including adding curing agents to said mixed minor fraction and mixing, and including separately mixing said major fraction and said minor fraction at a temperature ranging from about 180° F. to about 350° F., separately mixing said curing agents with said major fraction and separately mixing said curing agents with said minor fraction at a temperature of from about 130° F. to about 200° F., and mixing said mixed major fraction having curing agents therein and said mixed minor fraction having curing agents therein with each other at a temperature of from about 130° F. to about 200° F.

10. A process according to claim 9, including forming an item and curing said item.

11. A crack growth resistant heterogeneous rubber composition, comprising:
a mixed blend of a major fraction and a minor fraction forming said heterogeneous rubber composition, said major fraction and said minor fraction having chemically similar rubber and carbon black therein,
said heterogeneous composition comprising by weight approximately 100 total parts of rubber, and from about 60 to about 95 total parts of a carbon black,
said minor fraction comprising from about 10 to about 50 parts by weight of one or more rubber compounds and an amount by weight of carbon black ranging from about 2.5 parts to about 37.5 parts by weight, said rubber compound selected from the group consisting of nitrile rubber, a polymer made from a conjugated diene having from 4 to 12 carbon atoms, and a copolymer made from monomers selected from the group consisting of conjugated dienes having from 4 to 12 carbon atoms and vinyl substituted aromatics having from 8 to 12 carbon atoms, and
said major fraction comprising an identical one or more rubber compounds and a similar carbon black as in said minor fraction, said major fraction having an amount of said rubber ranging from about 50 parts to about 90 parts by weight, and said major fraction having a carbon black range by weight of from about 22.5 to about 92.5.

12. A crack growth resistant heterogeneous rubber composition according to claim 11, wherein in said major fraction the amount of said rubber is from about 55 to about 80 parts by weight and wherein said carbon black is from about 41 to about 85 parts by weight, and wherein in said minor fraction said amount of rubber is from about 20 to about 45 parts by weight and wherein said carbon black is from about 5 to about 34 parts by weight.

13. A crack growth resistant heterogeneous rubber composition according to claim 12, wherein said rubber in said major fraction and said minor fraction is selected from the group consisting of natural rubber, synthetic cis-1,4-polyisoprene, cis-polybutadiene, styrene-butadiene rubber, nitrile rubber.

14. A crack growth resistant heterogeneous rubber composition according to claim 13, and including at least another rubber in said major fraction and including at least a similar rubber in said minor fraction, wherein in said major fraction an amount of rubber is from about 60 to about 70 parts by weight and wherein said carbon black is from about 55 to about 77.5 parts by weight, and wherein in said minor fraction said amount of rubber is from about 30 to about 40 parts by weight and wherein said carbon black is from about 7.5 to about 30 parts by weight.

15. A crack growth resistant heterogeneous rubber composition according to claim 12, wherein said major fraction is mixed, wherein said minor fraction is added to said major fraction and mixed therewith.

16. A crack growth resistant heterogeneous rubber composition according to claim 12, wherein said major fraction is separately mixed, wherein said minor fraction is separately mixed, and wherein said fractions are added to each other and mixed.

17. A crack growth resistant heterogeneous rubber composition according to claim 14, wherein said major fraction is mixed, wherein said minor fraction is added to said major fraction and mixed therewith.

18. A crack growth resistant heterogeneous rubber composition according to claim 14, wherein said major fraction is separately mixed, wherein said minor fraction is separately mixed, and wherein said fractions are added to each other and mixed.

19. A crack growth resistant heterogeneous rubber composition according to claim 15, wherein said rubber in said minor fraction is identical to said rubber in said major fraction, and including curing agents in said rubber composition and wherein said rubber composition is in the form of a cured article.

20. A crack growth resistant heterogeneous rubber composition according to claim 17, wherein said rubber in said minor fraction is identical to said rubber in said major fraction, and including curing agents in said rubber composition and wherein said rubber composition is in the form of a cured article.

* * * * *